US006892340B1

(12) United States Patent
Depersin

(10) Patent No.: US 6,892,340 B1
(45) Date of Patent: May 10, 2005

(54) METHOD AND APPARATUS FOR REDUCING CHANNEL INDUCED ERRORS IN SPEECH SIGNALS

(75) Inventor: Laurent Depersin, Le Mans (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 232 days.

(21) Appl. No.: 09/618,188

(22) Filed: Jul. 18, 2000

(30) Foreign Application Priority Data

Jul. 20, 1999 (FR) .......................................... 99 09404

(51) Int. Cl.[7] .............................................. G06F 11/00
(52) U.S. Cl. ................................................... 714/747
(58) Field of Search ............................ 714/746, 747; 704/205

(56) References Cited

U.S. PATENT DOCUMENTS 5,432,778 A 7/1995 Minde et al. .............. 370/95.3
5,526,366 A * 6/1996 Jarvinen et al. ............ 714/746
5,907,822 A * 5/1999 Prieto, Jr. ................... 704/202
6,144,936 A * 11/2000 Jarvinen et al. ............ 704/225
6,161,091 A * 12/2000 Akamine et al. ........... 704/207
6,170,073 B1 * 1/2001 Jarvinen et al. ............ 714/752

* cited by examiner

*Primary Examiner*—Guy J. Lamarre
*Assistant Examiner*—Esaw Abraham
(74) *Attorney, Agent, or Firm*—Kevin Simons

(57) ABSTRACT

The invention proposes to improve the performance of the conventional methods of correcting channel transmission errors without increasing the redundance of encoding the channel. It is particularly advantageous for the systems which may be subjected to very poor transmission conditions such as radio interference or any other noise phenomenon in the channel. The invention provides the addition of a specific correction device after decoding the channel for detecting and correcting the residual channel errors exceeding the correction capacity of the channel decoder. It also proposes that the signal supplied by the decoder is a speech signal constituted by a limited number of determined speech elements. The invention provides permanent vocal recognition of the received signal with the aid of a dictionary of speech elements for detecting the transmission errors and for correcting them by replacing the erroneous part in the received signal by a synthesized part on the basis of the speech dictionary.

14 Claims, 2 Drawing Sheets

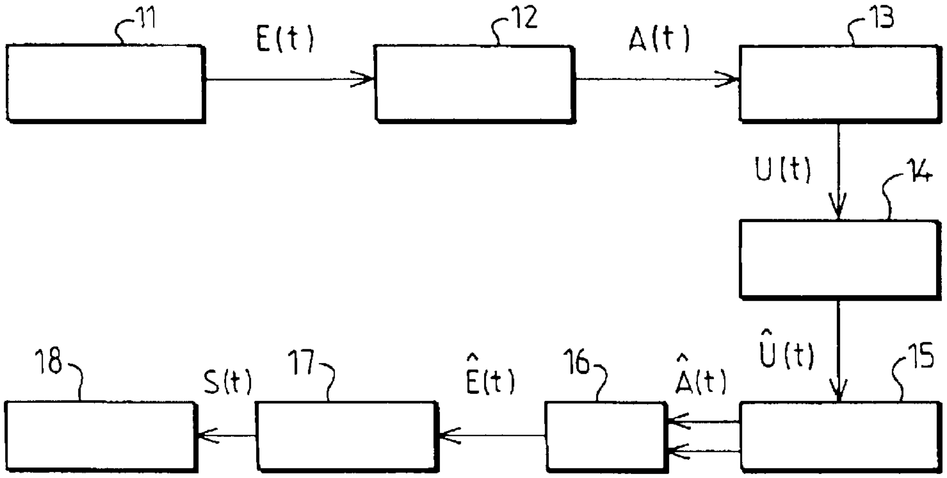
FIG.1
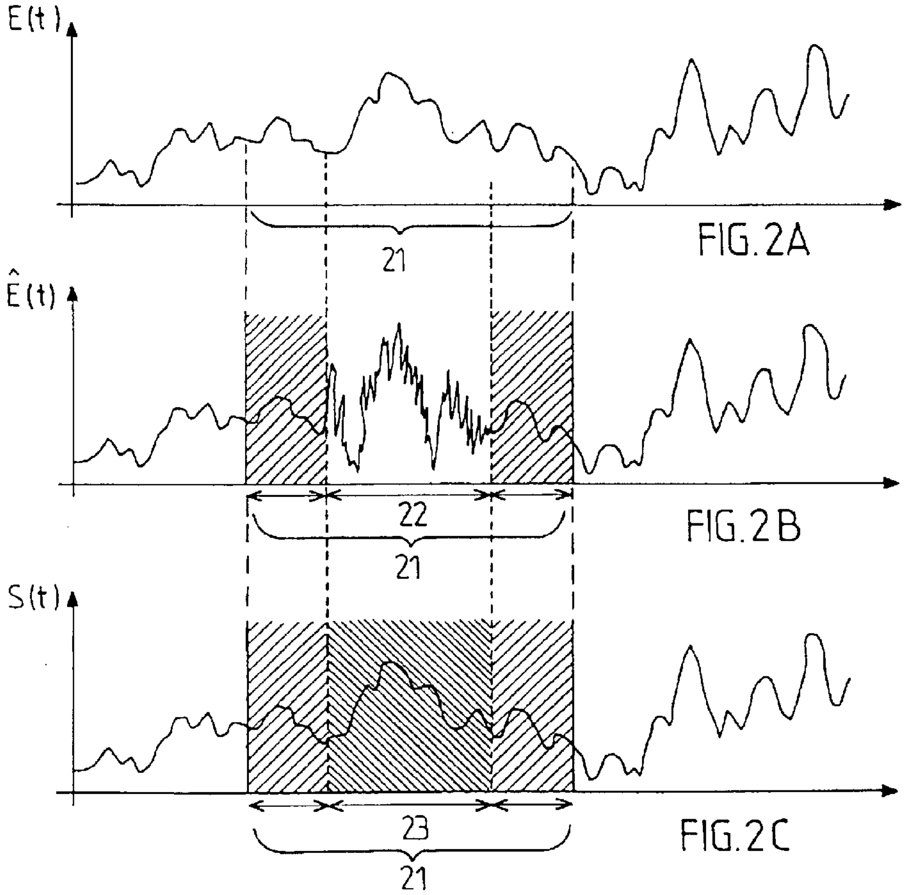
FIG.2A
FIG.2B
FIG.2C

METHOD AND APPARATUS FOR REDUCING CHANNEL INDUCED ERRORS IN SPEECH SIGNALS

BACKGROUND OF THE INVENTION

1. Field of the Invention

The invention relates to a receiver and a communication system for transmitting data frames between a transmitter and a receiver via a communication channel, the receiver comprising an error correction device for correcting transmission errors in the received data.

The invention also relates to the error correction device and to a method of correcting transmission errors in received digital data frames.

The invention is widely used in speech communication systems, notably in digital mobile telecommunication systems and voice-transmission systems using the IP (Internet Protocol) or ATM (Asynchronous Transfer Mode) protocol.

2. Description of the Related Art

U.S. Pat. No. 5,432,778 describes a method of detecting transmission errors in speech frames received by means of techniques using neuronal networks.

OBJECT AND SUMMARY OF THE INVENTION

It is an object of the invention to provide means which are less costly and less complex than those described in the above-mentioned document for detecting transmission errors in received data frames at the receiver end, as well as means for correcting them. To this end, it is proposed that the received data frames convey information intended to represent speech elements. The invention thus provides a receiver, a system and a device as described in the opening paragraph and is characterized in that the error correction device comprises:

- vocal recognition means for recognizing speech elements in the received data frames,
- detection means for detecting corrupted parts in the recognized speech elements,
- synthesis means for synthesizing parts of the speech elements corresponding to the corrupted parts, and
- replacement means for replacing said corrupted parts by the synthesized parts in the received data frames.

Irrespective of the type or size of the considered elements, the number of speech elements required for reconstituting all the words of the language is limited. However, this number may be a critical parameter in accordance with the envisaged application, particularly when the size of the memory and the computing power of the components used for realizing the invention should be limited. In accordance with a preferred embodiment, the invention therefore proposes that the speech elements constituting the received signal are phonemes or diphones, or any other vocal unit allowing a reconstitution of all the speech words by means of a limited number of units. In the majority of languages, for example, speech is constituted by about fifty phonemes.

These and other aspects of the invention are apparent from and will be elucidated, by way of non-limitative example, with reference to the embodiments described hereinafter.

BRIEF DESCRIPTION OF THE DRAWING

In the drawing:

FIG. 1 is a block diagram of the transmission chain of an example of the system comprising a transmitter and a receiver according to the invention, provided with an error correction device.

FIGS. 2A, 2B, and 2C show curves representing the speech signal as a function of time to illustrate the principal steps of a method according to the invention, realized by the error correction device shown in FIG. 1.

DETAILED DESCRIPTION OF THE PREFERRED EMBODIMENTS

Figure 3:
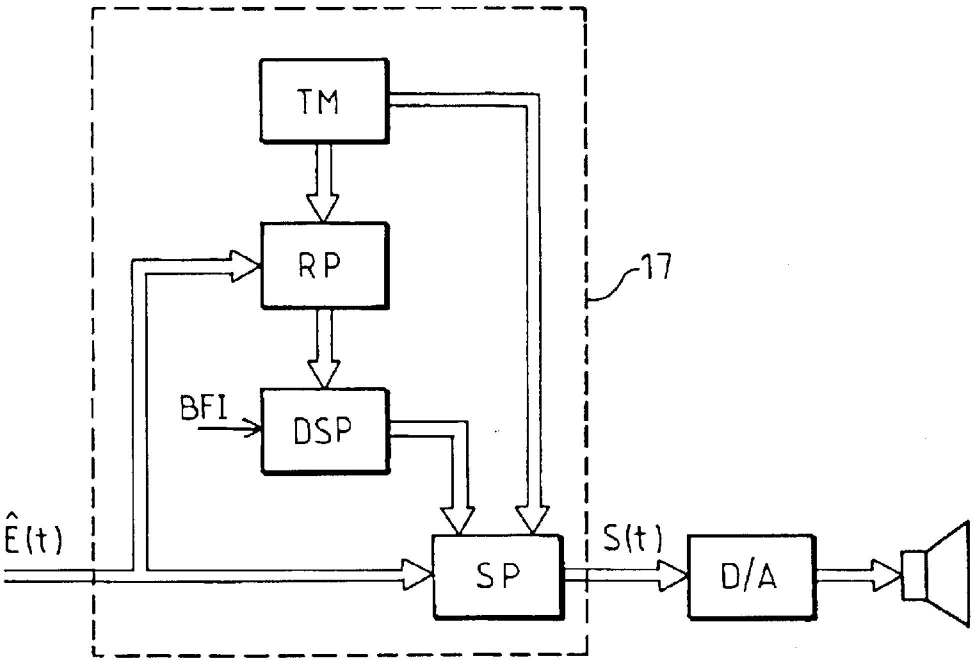
FIG. 3 shows an embodiment of the error correction device according to the invention, shown in FIG. 1.

FIG. 1 illustrates the transmission and reception chain of an example of the system comprising a transmitter and a receiver according to the invention. The transmitter comprises:

- a source block 11 comprising, for example, a microphone and an A/D converter for picking up an analog speech signal and producing a digital speech signal E(t) formed of binary data,
- an encoding block 12 intended to encode speech, on the one hand, for reducing the quantity of information to be transmitted through the channel by transmitting encoded symbol sequences A(t) representing the speech signal E(t) and for encoding the channel, on the other hand, for reducing the probabilities of transmission errors by introducing redundancy in the transmitted symbol sequences,
- a modulation block 13 for transforming the symbols A(t) provided by the encoding block 12 into a modulated signal U(t) to be transmitted through a communication channel 14.

The receiver comprises:

- a demodulation block 15 for demodulating the signal $\hat{U}(t)$ received from the channel 14 and for obtaining a demodulated signal $\hat{A}(t)$ comprising channel transmission errors,
- a decoding block 16 for performing the inverse operation of the encoding block 12 and providing binary data $\hat{E}(t)$ at the output, comprising residual transmission errors which have not been corrected during decoding of the channel and are notably due to interferences in the channel 14 for a radio transmission or are due to poor reception caused by a high noise level in the channel,
- a specific error correction block 17 for correcting the residual transmission errors detected in the decoded signal $\hat{E}(t)$ and for supplying a corrected output signal S(t);
- an output block 18 comprising, for example, a D/A converter and a loudspeaker/headphone for supplying an analog output signal to the user.

The channel decoding performance realized by the decoding block 16 depends on the transmission conditions and on a parameter: the length of constraint corresponding to the maximum number of corrupted consecutive bits which the channel decoder can correct. For example, in a low-noise channel, the data suffer from few channel transmission errors. A small constraint length is thus sufficient to obtain very good results at the channel decoding level. In contrast, in a high-noise channel, the data need more redundancy, i.e. a larger constraint length so as to ensure a good probability of recognition during decoding. The redundancy has, however, the major drawback that the quantity of information to be transmitted is increased, which is disadvantageous when the channel has a limited passband.

Therefore, the invention provides the addition of a specific correction block 17 after the decoding block 16 for detecting and correcting the residual channel errors exceeding the correction capacity of the channel decoder without increasing its constraint length. It is thus particularly advantageous in systems which may be subjected to very poor transmission conditions such as radio interference or any other noise phenomenon in the channel.

An error correction method according to the invention, performed, for example, by the correction block 17 is illustrated in FIGS. 2A, 2B and 2C. The Figures represent, as a function of time, the digital speech signal E(t) to be transmitted (FIG. 2A), the corrupted speech signal Ê(t) supplied to the error correction block 17 by the decoding block 16 (FIG. 2B) and the corrected speech signal S(t) at the output of the error correction block 17 (FIG. 2C).

In accordance with a fundamental principle of the invention, the signal Ê(t) supplied by the decoder 16 is a speech signal constituted by a limited number of determined speech elements. Starting from this strong hypothesis, the invention provides the use of a dictionary constituted by speech elements which are suitable for reconstituting all the words of the vocal language, and vocal recognition means for permanently recognizing the elements of the dictionary in the received signal during reception. In accordance with a preferred embodiment, a phoneme dictionary is used for effecting the vocal recognition and allowing restoration of the erroneous data frames up to a duration of 40 ms, which is shorter than the duration of the smallest phoneme of, for example, the English language (approximately 50 ms), the majority of phonemes having a size varying between about 80 and 130 ms.

The method according to the invention for correcting transmission errors in the received digital data frames constituting the corrupted signal Ê(t) comprises the following steps:

- a vocal recognition step for permanently recognizing speech elements in the received data frames,
- a detection step for detecting corrupted parts in the recognized speech elements,
- a synthesis step for synthesizing parts of the speech elements corresponding to the corrupted parts, and
- a replacement step for replacing said corrupted parts by the synthesized parts in the data frame.

In accordance with the diagram of FIG. 1 comprising the decoding block 16, the detection step is already partially effected during channel decoding realized by the decoder 16 which detects errors in the signal Â(t) at the output of the demodulator. This detection is realized by means of conventional error detection methods such as, for example, a method without a memory effect referred to as CRC (Cyclic Redundance Check) which provides an indicator of the corrupted frame, or BFI (Bad Frame Indicator), or a method with a memory effect using a convolution code and a Viterbi detector. As described above, these methods can be carried out to a certain degree of corruption of the speech signal. Beyond this, the use of error correctors 17 will be very interesting for correcting the residual errors left by the conventional channel decoder. In accordance with a variant of an embodiment of the invention, an original complementary detection method may be used as a complement to the conventional specific detection means used by the decoder 16. It concerns the use of the result of the vocal recognition during the step of recognizing and synchronizing the signal Ê(t) with respect to the elements of the speech dictionary for simultaneously detecting errors in the recognized speech elements. To this end, the invention directly uses the information supplied by the score of the vocal recognition which indicates a probability of recognizing the current element among the elements of the dictionary. Above a first fixed recognition threshold, for example, between 80% and 100%, the element is considered to be recognized without a necessary correction. Below a second fixed recognition threshold (smaller than the first threshold), of the order of, for example, 10% to 20%, the element is considered to be not recognized without a possibility of correction. Between the two thresholds, the recognition score is used to also indicate a residual error rate to be corrected.

The result of the vocal recognition and error detection steps is illustrated in FIG. 2B. The speech element accentuated by horizontal braces 21 is recognized among the elements of the dictionary during the vocal recognition step permanently effecting the recognition of the data frames during their reception by comparison with all the parallel elements of the dictionary. For a hypothesis required to comprehend the Figure, the start and the end of the element 21 are perfectly synchronized with a given element of the dictionary. An erroneous part accentuated by a double horizontal arrow 22 of the speech element 21 is detected in accordance with the above-described detection methods.

The result of the synthesis and replacement steps is illustrated in FIG. 2C. The part of the recognized speech element 21 accentuated by a double horizontal arrow 23 and corresponding to the erroneous part 22 is synthesized on the basis of information contained in the dictionary for replacing the erroneous part 22 in the element 21 of the frame of received data.

FIG. 3 is a block diagram representing the principal functions of the error correction device according to the invention. The input of the device receives the corrupted speech signal Ê(t) supplied, for example, by the decoder 16 shown in FIG. 1 so as to supply, at the output, a corrected speech signal S(t) to a loudspeaker. It comprises:

- a storage memory TM for storing the information of the dictionary of speech elements, this information being constituted by characteristics allowing identification and synthesis of each speech element,
- a recognition processor RP for example of the kind described in application No. EP 0 788 648-A1 for receiving the signal Ê(t) and for permanently recognizing the speech elements of the dictionary,
- a control device of the signal processor type DSP for receiving, from the processor RP and/or a specific exterior error detector, information about the quality of the current frame Ê(t) so as to determine whether it comprises transmission errors,
- a synthesis processor SP for realizing the synthesis, under the control of the control device DSP and by means of information about the reference element contained in the memory TM, of the part of the reference element corresponding to the erroneous part, and for replacing the erroneous part by the synthesized part in the received data frame Ê(t) so as to obtain a corrected output signal S(t),
- a D/A converter D/A for converting the digital output signal S(t) supplied by the processor SP into an analog signal for a loudspeaker.

In accordance with the method chosen for detecting errors in the recognized speech element, two variants are possible. In accordance with the first method, the control device DSP receives only the information concerning the recognized dictionary element from the processor RP, on the one hand, and a bad frame indicator BFI from a specific exterior detection device, on the other hand, which indicator originates from the channel decoding step realized by the decoder 16. In accordance with the complementary method, it also receives, from the processor RP, an indication of the error deduced from the vocal recognition score.

Figure 4:
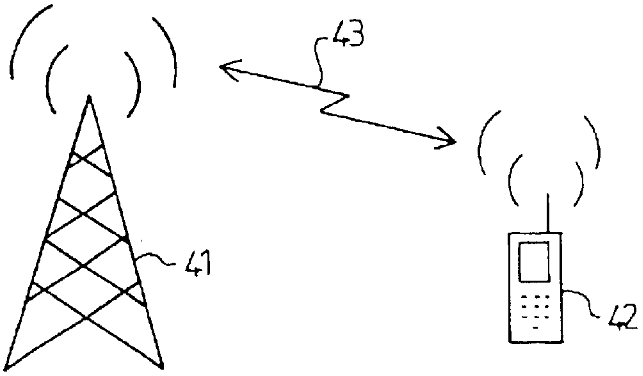
FIG. 4 illustrates an example of the communication system according to the invention, comprising a telephone transmitter and receiver.

FIG. 4 illustrates an example of the communication system according to the invention for transmitting data frames between at least one transmitter 41 and at least one receiver 42 via a communication channel 43. In the embodiment of FIG. 4, the transmitter 41 is a base station of a mobile radio telephone system, and the receiver 42 is a cellular telephone. The base station of the telephone comprises a transmission chain and a reception chain, respectively, of the cell type shown in FIG. 1. As a function of the type of communication, notably bidirectional, the transmitters and receivers may be inverted when, for example, the telephone transmits a message for the base station.

The invention is also applicable to many other systems comprising other types of transmitters and receivers such as vocal communication systems on the Internet using computers as transmitters/receivers provided with a voice transmission protocol layer like VOIP (Voice over IP) or VOATM (Voice over ATM).

A system comprising a transmitter and a receiver, an error correction device and an economical and relatively easy method of detecting and correcting channel transmission errors exceeding the correction capacity of the channel decoder have thus been described and illustrated by way of example. It should be noted that numerous variants of the described embodiments are possible without departing from the scope of the invention.

What is claimed is:

1. A receiver for receiving data frames transmitted through a communication channel and comprising an error correction device for correcting transmission errors in the received data, wherein said error correction device comprises:

storage means for storing information associated with a predetermined set of speech elements that are suitable for reconstituting words of a vocal language, the predetermined set of speech elements being different than the data in the received data frames, vocal recognition means configured to use the information associated with the predetermined set of speech elements to recognize corresponding speech elements in the received data frames, detection means for detecting corrupted parts in the recognized speech elements, synthesis means configured to use the information associated with the predetermined set of speech elements to synthesize parts of the recognized speech elements corresponding to the corrupted parts, and replacement means for replacing said corrupted parts by synthesized parts in the received data frames.

2. The receiver as claimed in claim 1, wherein said speech elements are phonemes or diphones.

3. The receiver as claimed in claim 1, wherein the receiver is incorporated in telephone equipment.

4. The receiver of claim 1, wherein the predetermined set of speech elements comprise a dictionary; and wherein the vocal recognition means is operable to provide a probability of recognizing a received element among the elements of the dictionary.

5. An error correction device for correcting transmission errors in received digital data frames, comprising:

storage means for storing information associated with a predetermined set of speech elements that are suitable for reconstituting words of a vocal language, the predetermined set of speech elements being different that the data in the received data frames, vocal recognition means configured to use the information associated with the predetermined set of speech elements to recognize corresponding speech elements in the received data frames, detecting means for detecting corrupted parts in the recognized speech elements, synthesis means configured to use the information associated with the predetermined set of speech elements to synthesize parts of the recognized speech elements corresponding to the corrupted parts, and replacement means for replacing said corrupted parts by the synthesized parts in the received data frames.

6. The error correction device as claimed in claim 5, wherein said speech elements are phonemes or diphones.

7. The error correction device of claim 5, wherein the predetermined set of speech elements comprise a dictionary; and wherein the vocal recognition means is operable to provide a probability of recognizing a received element among the elements of the dictionary.

8. A communication system for transmitting data frames between a transmitter and a receiver via a communication channel, the receiver comprising an error correction device for correcting transmission errors in the received data, wherein said error correction device comprises:

storage means for storing information associated with a predetermined set of speech elements that are suitable for reconstituting words of a vocal language, the predetermined set of speech elements being different than the data in the received data frames, vocal recognition means configured to use the information associated with the predetermined set of speech elements to recognize corresponding speech elements in the received data frames, detecting means for detecting corrupted parts in the recognized speech elements, synthesis means configured to use the information associated with the predetermined set of speech elements to synthesize parts of the recognized speech elements corresponding to the corrupted parts, and replacement means for replacing said corrupted parts by the synthesized parts in the received data frames.

9. The communication system as claimed in claim 8, wherein said speech elements are phonemes or diphones.

10. The communication system of claim 8, wherein the predetermined set of speech elements comprise a dictionary; and wherein the vocal recognition means is operable to provide a probability of recognizing a received element among the elements of the dictionary.

11. An error detection method for correcting transmission errors in received digital data frames, comprising:

storing information associated with a predetermined set of speech elements that are suitable for reconstituting words of a vocal language, the predetermined set of speech elements being different than the data in the received data frames, using the information associated with the predetermined set of speech elements to permanently recognize corresponding speech elements in the received data frames, detecting corrupted parts in the received speech elements, using the information associated with the predetermined set of speech elements to synthesize parts of the recognized speech elements corresponding to the corrupted parts, and replacing said corrupted parts by the synthesized parts in the data frame.

12. The error correction method as claimed in claim 11, wherein said speech elements are phonemes or diphones.

13. The method of claim 11, wherein the predetermined set of speech elements comprise a dictionary; and further comprising providing a probability of recognizing a received element among the elements of the dictionary.

14. The method of claim 13, further comprising determining, based at least in part on the probability of recognizing the received element among the elements of the dictionary, whether to replace the received element.

* * * * *